Figure 1:
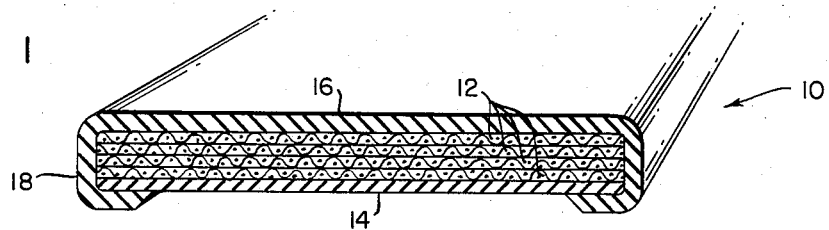

July 3, 1962     R. H. ELLIOTT     3,041,661

PROCESS AND APPARATUS FOR MAKING CONVEYOR BELTING

Filed Aug. 25, 1960     2 Sheets-Sheet 1

*INVENTOR.*
ROBERT H. ELLIOTT
BY

ATTORNEYS

July 3, 1962 R. H. ELLIOTT 3,041,661
PROCESS AND APPARATUS FOR MAKING CONVEYOR BELTING
Filed Aug. 25, 1960 2 Sheets-Sheet 2
FIG. 4
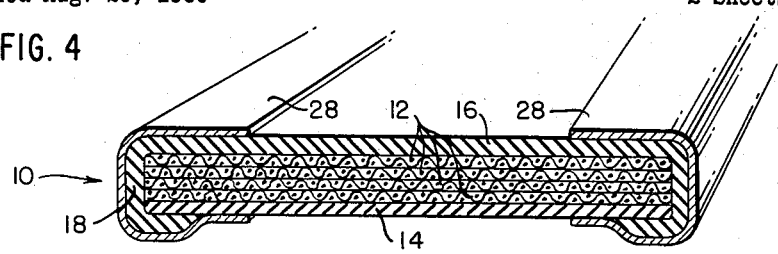
FIG. 5
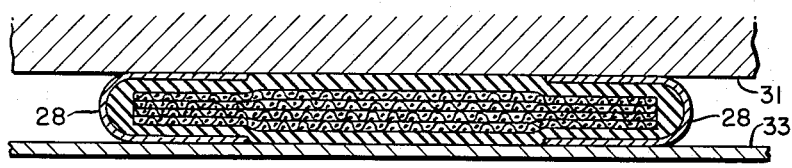
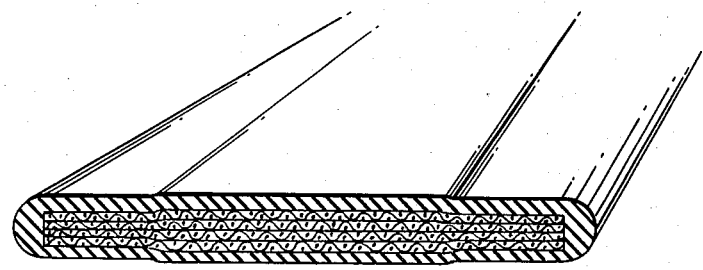
FIG. 6
INVENTOR.
ROBERT H. ELLIOTT
BY
ATTORNEYS

United States Patent Office 3,041,661
Patented July 3, 1962

3,041,661
PROCESS AND APPARATUS FOR MAKING CONVEYOR BELTING
Robert H. Elliott, Lincoln, Mass., assignor to American Biltrite Rubber Co., Inc., Chelsea, Mass., a corporation of Delaware
Filed Aug. 25, 1960, Ser. No. 51,918
3 Claims. (Cl. 18—6)

This invention relates to the continuous vulcanizing or curing of elastomeric strip sheet material. More particularly the invention comprises a novel process and apparatus for the production of improved conveyor belting and similar strip material vulcanized or cured under pressure between two moving surfaces, at least one of which is heated.

Although there are a good many conveyor systems wherein the conveyor belt is maintained flat and operated between skirt panels to support relatively light loads over short distances, the majority of conveyors operate over inclined idler rolls which form a trough lengthwise of the conveyor belt and thus increase its load carrying capacity. The conveying surfaces of these belts are subject to very hard wear and are therefore fabricated with a thick cover piece to improve their wearing characteristics.

Despite the fact that the flat load carrying surface of a conveyor is subjected to severe wearing conditions, it has been found that conveyor belts wear most rapidly at their edges. This is due to the fact that while the belts normally are so guided as to move in a straight path they frequently shift laterally and rub against the conveyor frame or parts of the conveyor housing. Contact of the moving belt edges with fixed portions of the conveyor structure produces rapid wear of the belt edges and reduces the useful life of the entire belt.

For this reason conveyor belts have been made with reinforced edges by adding extra layers of rubber to the marginal portions and including reinforcing plies of textiles within the belt body which are extended about the edges.

Typically a conveyor belt is composed of a carcass made from plies of woven textile imbedded between top and bottom covers, both of which are made from elastomeric materials such as rubber, vinyl compounds and the like, the top cover being usually somewhat thicker than the bottom cover and wide enough to be folded over the edges of the carcass onto the bottom cover. The various components are molded and vulcanized by heating the rubber to vulcanizing temperatures after compressing the plies between two flat surfaces. The edges of the heated belt are restrained against lateral flow during the molding operation by rectangular steel side bars, or molding edge rings when using a rotary mold, so that the edge surfaces lie at right angles to the belt carrying surface.

Belt edges so contoured tend to wear rapidly at the corners when the moving belt contacts fixed members of the conveyor structure or with the conveyed material. Another disadvantage of this type edge takes place during the forming operation. When the treated belt is pressed between the two molds, excess rubber or "overflow" is forced out between the pressure plates and over the side bars or edge rings. As a result the carcass of the belt is partly distorted and a rather large percentage of the belt cover rubber is wasted in the flash which must be trimmed off the molded belt. This distortion due to the flow of the cover rubber tends to displace the carcass fabric from the center towards the edge of the belt. In some cases a portion of the carcass shifts into the overflow where it is trimmed off. In such cases, water may work its way into the carcass and rot the fabric.

It is an object of the present invention to provide a novel process and apparatus for producing a conveyor belt having an edge formation displaying improved wearing characteristics.

Another object of this invention is to provide a process and apparatus for economically producing belting without wasting rubber or distorting the carcass.

Yet another object of this invention is to provide a process and apparatus for continuously molding and vulcanizing or curing conveyor belting characterized by smooth rounded edges of uniform shape and thickness.

More particularly this invention features a novel process for producing molded conveyor belting wherein a ribbon of flexible unresilient sheet material is temporarily applied to each edge of the belt prior to molding and vulcanizing the belt. The ribbon is folded over the edges and replaces the steel side band and edge rings previously used during molding and vulcanizing operations. When pressure is applied to the heated belt the softened elastomeric material will be restrained against lateral flow by reason of the ribbon. As a result the cured belt after removal of the ribbon will present a smooth rounded edge of constant thickness with no loss of rubber due to overflow.

In respect to the apparatus the invention also features a feed spool and guide rolls mounted adjacent to the belt to apply the ribbon to the belt edges.

Figure 2:
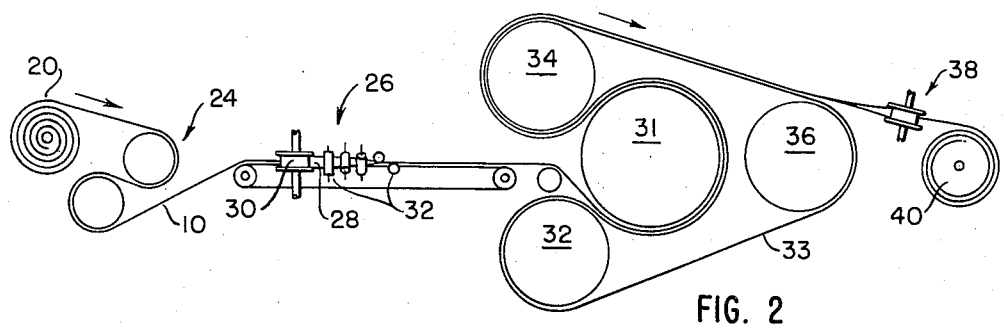
Figure 3:
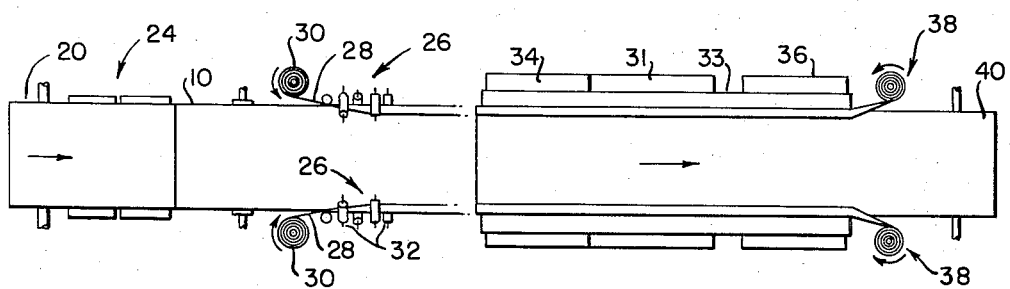

These and other features of the invention along with further objects and advantages thereof will appear more fully from the following detailed description taken in connection with the accompanying drawings in which:

FIG. 1 is a fragmentary perspective view illustrating in detail the construction of typical conveyor belting prior to being molded and vulcanized, FIG. 2 is a diagrammatic view in side elevation showing suitable apparatus for carrying out the process, FIG. 3 is a top plan view corresponding to FIG. 2, FIG. 4 is a fragmentary view in perspective of the belting with the ribbon applied to the edge, FIG. 5 is a view in cross section showing the belting with the ribbon being molded between two flat surfaces, and FIG. 6 is a fragmentary view in perspective of the finished belting.

Referring now to the drawings there is illustrated in FIG. 1 a partly formed conveyor belt 10 having a carcass 12 consisting of laminated textile plies. A bottom or pulley cover 14, coextensive with the carcass, is applied to the bottom surface of the carcass while a somewhat wider top cover 16 overlays the top of a carcass and is folded over the carcass edge as at 18 and lapped over the pulley cover 14. Preferably both the pulley cover 14 and the top cover 16 are of elastomeric composition such as natural or synthetic rubber together with compounding ingredients. It will be noted that the top cover 16 is somewhat thicker than the pulley cover since the top and edge portion 18 are subject to greater wear.

Referring now to FIG. 2, a coil 20 of the uncured belting 10 like that of FIG. 1 is mounted to feed a continuous length of the belting into a rotary mold and vulcanizer. Upon leaving the coil 20 the belting 10 is led first through a tensioning device 24 (such as that shown in U.S. Patent No. 2,082,895) which stretches the belting to the desired increment of length prior to molding, this being a usual feature of belt molding and vulcanizing which controls the final modulus of the finished belt.

Upon leaving the tensioning device 24 the belting 10 proceeds through a dispensing station 26 at which a narrow ribbon or edge mold strip 28 is applied to each longitudinal edge of the belting. The mold strip is preferably made from flexible, stretchable sheet material, such as glass fibre or metal weave. The dispensing station includes a supply coil 30 located adjacent each edge of the belting with its axis oriented normal to the plane of the belting 10. A plurality of guide rolls 32 are spaced along both edges of the belting immediately after the coil 30 and serve to fold or wrap the initially flat ribbon 28 evenly along the edges and over marginal portions of the belting as illustrated in FIG. 4.

It will be noted that the axis of the guide rolls vary with respect to the surface of the belting. The leading guide roll is disposed normal to the plane of the belting with succeeding rolls being inclined towards and over the belting. The last of these rolls are parallel to the belting surface and bear against the margin of the belting so that the ribbon 28 will adhere thereto. The ribbon 28 may be so adhesively treated that a moderate adhesion to the belt surface is obtained when the ribbon is applied to the belt or the ribbon may be stapled in position prior to starting the process. The use of adhesives to retain the ribbon in place may be avoided by having the ribbon provided with an open mesh so that the material of the cover of the ply of the belting penetrates slightly into the ribbon and holds it temporarily in position. After curing the mesh ribbon may be readily stripped from the penetrating material of the cover ply.

Upon leaving the dispensing station 26 the belting with the applied ribbon is fed into the bite of a continuous press and vulcanizer such as that disclosed in United States Patent No. 2,039,271. The vulcanizer illustrated in FIGS. 2 and 3 includes a large vulcanizing cylinder 31 suitably heated by steam or the like and mounted for free rotation about a horizontal axis. An endless flexible steel tension band 33 is looped about a substantial portion of the vulcanizing cylinder 31 and also about a pressure drum 32 mounted tangent to the vulcanizing cylinder. The pressure drum 32 may also be heated to provide two heated molding surfaces for the belting as it is introduced to the bite of the continuous vulcanizer.

As best seen in FIG. 5 the heated belting 10 when compressed between the two molding surfaces of the cylinder 31 and band 30 tends to flow laterally. This lateral flow is restrained by the ribbon 28 so that the edge portions 18 of the rubber cover are formed into smoothly rounded edges of constant thickness and with no distortion of the carcass 12. There is no wastage of rubber involved since the ribbon 28 effectively controls the shape of the edges without flashing or similar molding defects. After the tension band 33 with the belt 10 has passed about the cylinder 31 it is looped over a driving drum 34 mounted tangent to the vulcanizing cylinder and then about a tension roll 36. The molded belting is separated from the band as it reaches the tension roll. Upon leaving the tension band the ribbon 28, having served its function, is stripped from the belting in a suitable manner, as by being wound up on rolls 38 located on the discharge side of the vulcanizer adjacent the path of the moving belt. A belt wind-up roll 40 is provided for storing the finished belt.

Referring to FIG. 6 there is illustrated a perspective view in section of the belting 10 as it appears in finished form. It will be seen that the edges are smoothly rounded with a relatively thick layer of rubber evenly distributed along the length thereof. The marginal portions of the belting are slightly recessed as a result of the edge forming process and impart a rather decorative effect to that area. The recess will vary in depth according to the thickness of the ribbon used but for conventional materials will be in the neighborhood of .015".

By reason of the rounded edges, uniform thickness of edge rubber and lack of distortion of reinforcing components the belting provides wearing qualities that are superior to those heretofore available. The process eliminates the use of molding edge rings which are expensive to maintain and which must be varied in height depending on the thickness of the belt being cured. Since no rings are required, belts under $3/16''$ thick may easily be molded, whereas rings of $3/16''$ or less have been found to be impractical.

While the invention has been described with particular reference to the illustrated embodiment it will be obvious that many modifications will appear to those skilled in the art without departing from the spirit and scope of the appended claims.

What I claim and desire to obtain by Letters Patent of the United States is:

1. The process of continuously producing flat round-edge belting with elastomeric covering material while curing the same, which comprises the following steps, viz.—
    (1) leading a flat ribbon of flexible sheet material to each edge of the uncured belting,
    (2) folding the ribbon about the opposite edges of the belting,
    (3) temporarily and progressively securing marginal portions of the flexible ribbon to the flat faces of the belting,
    (4) while forming in the ribbon a bight of semi-circular cross section extending longitudinally along each edge,
    (5) progressively heating and molding the elastomeric covering material of the belting and thereby causing it to flow progressively into and fill the bight of the ribbon, and
    (6) removing the ribbon for reuse after the material has set.

2. A process of continuously producing round-edge belting as described in claim 1, further characterized in that the flexible ribbon is of open weave fabric and that it is secured to the belting by penetration of the elastomeric covering material through the interstices of the open weave ribbon.

3. Apparatus for producing flat round-edge belting with elastomeric covering plies, comprising a reel for uncured belting, a rotary curing press, and interposed means for delivering an initially flat fabric ribbon to each edge of the belting, folding the ribbon about each edge and at the same time securing the margins of the ribbon to the opposite flat faces of the traveling belting and thereby forming approximately semi-circular bights extending longitudinally along the belting, said delivering and folding means comprising a series of rolls of which the leading roll is disposed with its axis normal to the plane of the belting and the succeeding rolls are progressively inclined toward and over the belting.

References Cited in the file of this patent
UNITED STATES PATENTS

| | | |
|---|---|---|
| 906,215 | Gammeter | Dec. 8, 1908 |
| 913,720 | Gammeter | Mar. 2, 1909 |
| 1,203,859 | Duecker | Nov. 7, 1916 |
| 1,279,601 | Spadone | Sept. 24, 1918 |
| 2,159,543 | Baker | May 23, 1939 |
| 2,179,443 | Bierer | Nov. 7, 1939 |
| 2,179,444 | Bierer | Nov. 7, 1939 |
| 2,187,253 | Wallace | Jan. 16, 1940 |
| 2,293,914 | Nanfeldt | Aug. 25, 1942 |